Oct. 31, 1939.     T. V. BUCKWALTER     2,177,925
LOCOMOTIVE CRANKPIN BEARING
Filed Oct. 7, 1938
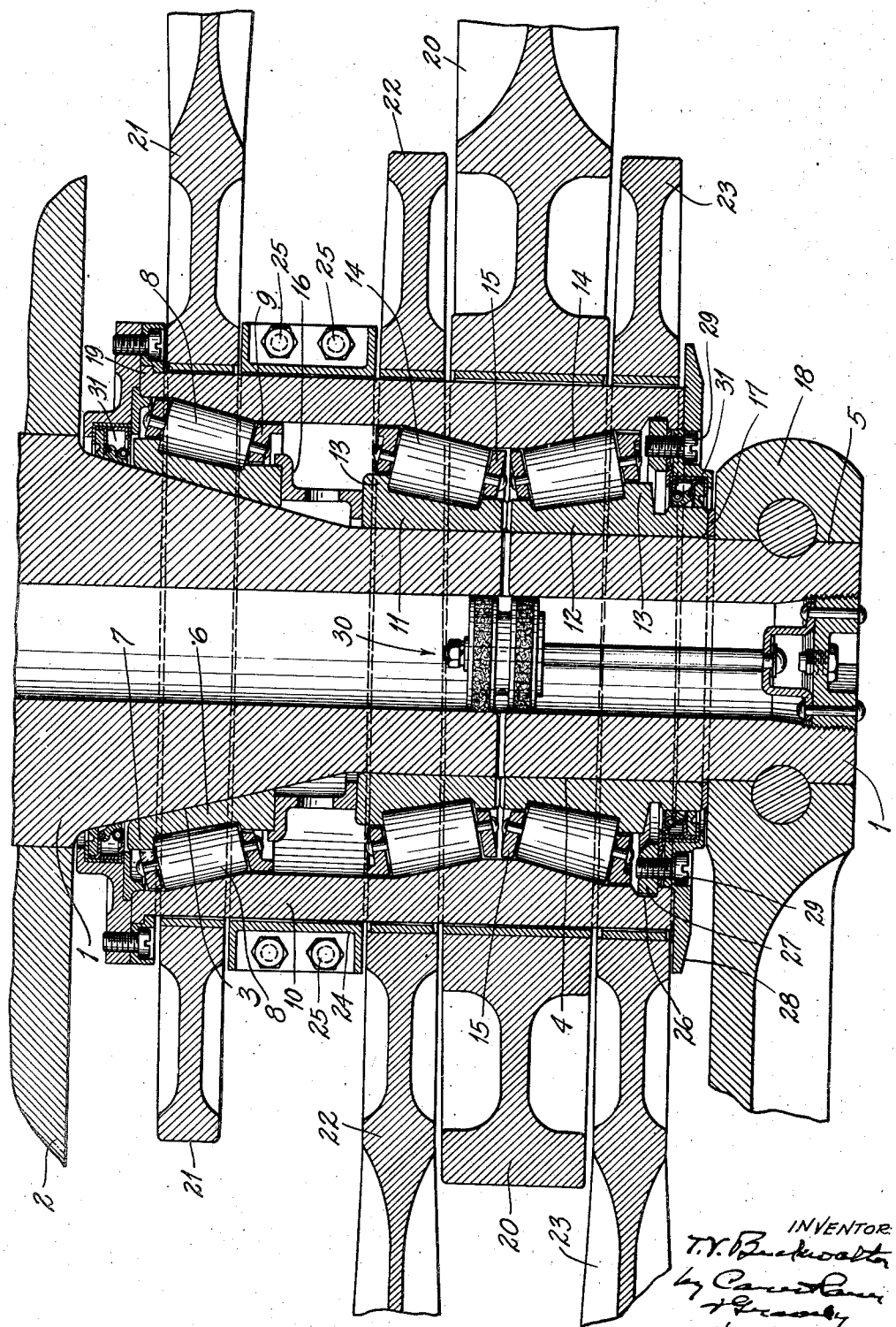

Patented Oct. 31, 1939

2,177,925

UNITED STATES PATENT OFFICE 2,177,925

LOCOMOTIVE CRANKPIN BEARING

Tracy V. Buckwalter, Massillon, Ohio, assignor to The Timken Roller Bearing Company, Canton, Ohio, a corporation of Ohio Application October 7, 1938, Serial No. 233,742

4 Claims. (Cl. 74—580)

This invention relates to locomotive crank pin bearings and has for its principal object to improve the bearing of my Patent No. 1,951,126 and especially to increase the bearing capacity and improve the action thereof without increasing its overall dimensions. The invention consists in the arrangements and combinations of parts hereinafter described and claimed.

The accompanying drawing, which forms part of this specification, is a longitudinal sectional view of a locomotive crank pin and associated parts disposed conformably to my invention.

The present construction comprises a crank pin 1 mounted on a main driving wheel 2 of a locomotive. The portion of the pin that projects beyond the wheel comprises three portions, namely, a conical portion 3 next to the wheel, a main cylindrical portion 4 next to the conical portion and a cylindrical portion 5 of somewhat smaller diameter at the outer end of the pin. On the tapered portion of the pin is mounted a cone or inner raceway member 6 which has a conical inner raceway with a thrust rib 7 at its large end which is toward the wheel. On this raceway are a series of tapered rollers 8 spaced apart by a suitable cage 9. An outer conical raceway is provided for said rollers in a cup or outer raceway member 10 hereinafter described.

On the main cylindrical portion 4 of the crank pin are two cones or inner raceway members 11, 12 that taper toward each other and have thrust ribs 13 at the large ends of their raceways. A circular series or row of tapered rollers 14, with suitable cages 15 therefor are provided for the respective cones 11, 12; and outer raceways for the respective series or rows of rollers 14 are formed on the sleeve or outer raceway member 10 hereinafter described.

The position of the cone 6 of the innermost bearing longitudinally of the pin is determined by the fit of its conical bore on the conical portion 3 of the pin. The position of the middle bearing is determined by a suitable spacing ring 16 which bears at one end against the cone 6 of the innermost bearing and at the other end against the large end of the cone 11 of the middle bearing, this spacer being of such width as to fit the space between said innermost and middle cones when their cooperating rollers fit their outer raceways. The cone 12 of the outermost bearing is slipped endwise of the pin into proper position and is held there by means of a shim or a spacing ring 17 interposed between its end and the end of the hub 18 of the valve gear arm or other device that is rigidly fastened to said pin.

The outer raceway of the three bearings are preferably made on the inner surface of a single integral sleeve or outer raceway member 10. The outer surface of this outer raceway member is cylindrical except for a circumferential rib 19 at the inner end thereof. The main rod 20 and three connecting driving rods 21, 22, 23 are freely mounted on the cylindrical portion of this outer raceway member, the front connecting rod 21 being innermost and in substantial alinement with the innermost roller bearing. Next to the front connecting rod is a rear connecting rod 22, being spaced therefrom by a suitable spacing ring 24 that is preferably made in halves secured together by bolts 25. Next to said rear connecting rod 22 is the main rod 20 and next to it is the second rear connecting rod 23. The hub of the main rod 20 encloses the smaller end portions of the middle and outer bearings, and the hub of the inner rear connecting rod 22 encloses the large end portion of the middle bearing, and the inner end of the hub of the outer rear connecting rod 23 enclosing the outer end portion of the outer bearing.

The outer raceway member 10 has an annular groove 26 in its outer end, and in this groove is a split ring 27 that is provided with a series of tapped holes. Beyond the end of the outer raceway member 10 is a second ring 28 that is provided with openings in alinement with said tapped holes. Cap screws 29 extend through the holes in the outer ring and work in the tapped holes in the inner ring and serve to clamp the inner ring against the outer wall of the groove 26 in the outer raceway member and to clamp the outer ring 28 against the end of said outer raceway member 10. The peripheral portion of the outer ring extends beyond the outer raceway member and serves as a guide or limiting stop for the hub of the outermost connecting rod. It is noted that the outer raceway member cannot move longitudinally except a slight amount desired for clearance. A suitable system 30 is provided for lubricating the bearing through the main pin and suitable sealing devices 31 are provided at the respective ends of the outer raceway member.

It is noted that, in the foregoing arrangement, some portion of each rod hub is in the same plane perpendicular to the axis of the pin as one of the roller bearings. In consequence of this relation, the stresses are transmitted between the bearings and rods without any substantial offset or overhang. It is also noted that, in comparison with the construction of my Patent No. 1,951,126, the middle bearing is an additional bearing which greatly increases the bearing capacity of the construction and that it is positioned partly inside the hub of the main rod and partly inside the hub of the inner rear rod where it contributes special advantages due to its alinement with the stresses imposed in service.

What I claim is:

1. In a locomotive drive gear, the combination of a driving wheel, a main eccentric pin mounted on said wheel, three roller bearings on said pin, a front connecting rod close to the wheel with its hub enclosing the innermost bearing, a main rod with its hub enclosing the adjacent ends of the other two bearings, and two rear connecting rods on opposite sides of the main rod with their hubs enclosing the distant end portions of said other bearings respectively.

2. In a locomotive drive gear, the combination of a driving wheel, a main eccentric pin mounted on said wheel, three roller bearing cones on said pin, a series of tapered rollers on each cone, an outer bearing member having three conical raceways for the respective series of rollers, a front connecting rod close to the wheel with its hub enclosing the innermost series of rollers, a main rod with its hub enclosing the adjacent end portions of the other two series of rollers and two rear connecting rods on opposite sides of the main rod with their hubs enclosing the distant end portions of said other series of rollers.

3. In a locomotive drive gear, the combination of a driving wheel, a main eccentric pin mounted on said wheel, three roller bearing cones on said pin, the innermost and middle cones tapering outwardly and the outermost cones tapering inwardly, a series of tapered rollers on each cone, an outer bearing member having three conical raceways for the respective series of rollers, a front connecting rod close to the wheel with its hub enclosing the innermost series of rollers, a main rod with its hub enclosing the adjacent end portions of the other two series of rollers and two rear connecting rods on opposite sides of the main rod with their hubs enclosing the distant end portions of said other series of rollers.

4. In a locomotive drive gear, the combination of a driving wheel, a main eccentric pin mounted on said wheel, three tapered roller bearings on said pin, said bearings having separate inner raceway members and an integral sleeve with three outer raceways for the respective bearings, and series of tapered rollers for each pair of inner and outer raceways, the raceways of the innermost and middle bearings tapering outwardly and the raceways of the endmost bearing tapering inwardly, a front connecting rod close to the wheel with its hub enclosing the innermost bearing, a main rod with its hub enclosing the adjacent ends of the other two bearings, and two rear connecting rods on opposite sides of the main rod with their hubs enclosing the distant end portions of said other bearings.

TRACY V. BUCKWALTER.